Sept. 18, 1945.  J. E. CHAPMAN  2,385,060
MODULATING MEANS FOR COOLER CONTROL
Filed Sept. 7, 1942   2 Sheets-Sheet 1
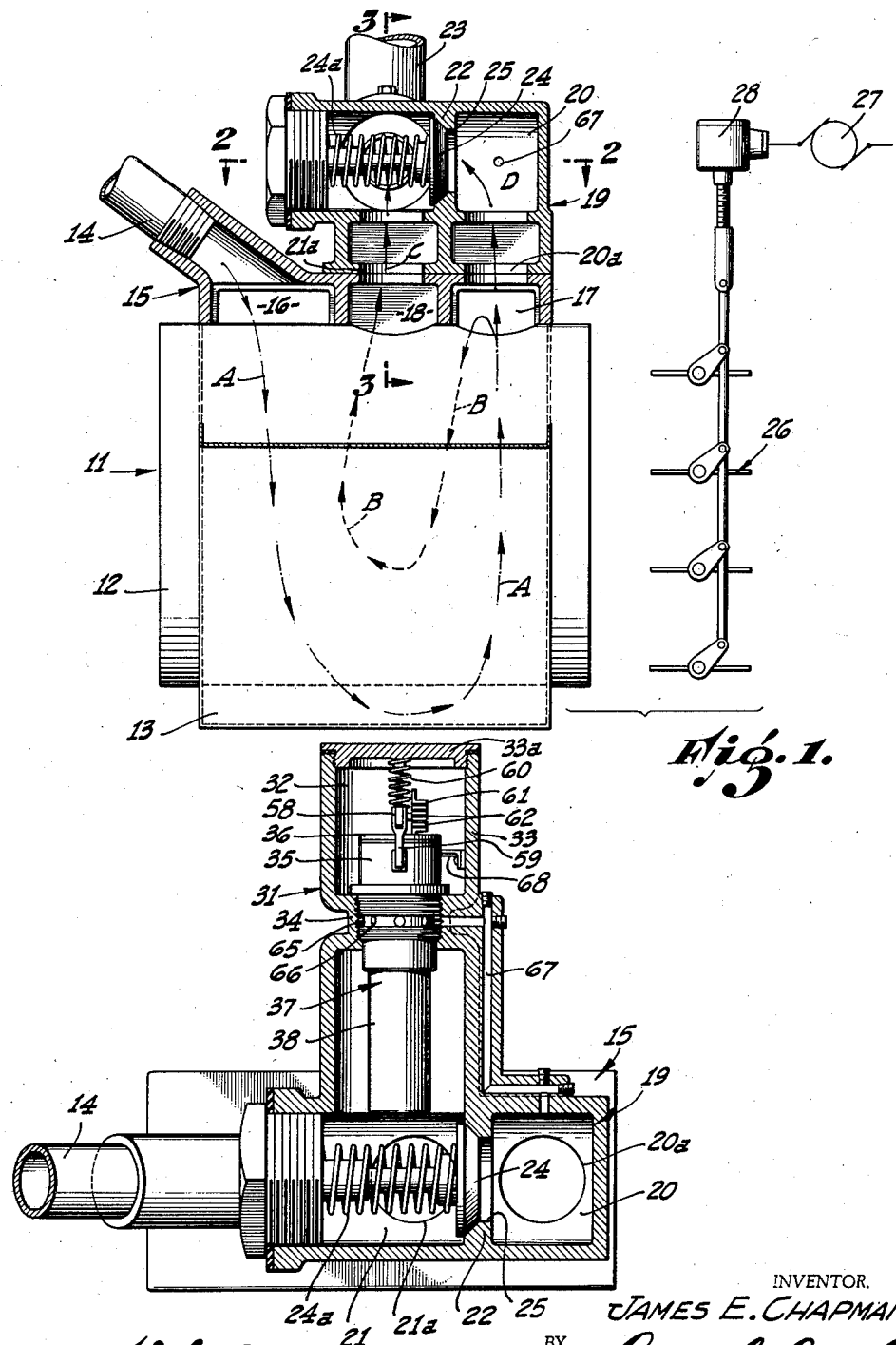
INVENTOR.
JAMES E. CHAPMAN
BY
ATTORNEY.

Sept. 18, 1945.    J. E. CHAPMAN    2,385,060
MODULATING MEANS FOR COOLER CONTROL
Filed Sept. 7, 1942    2 Sheets-Sheet 2
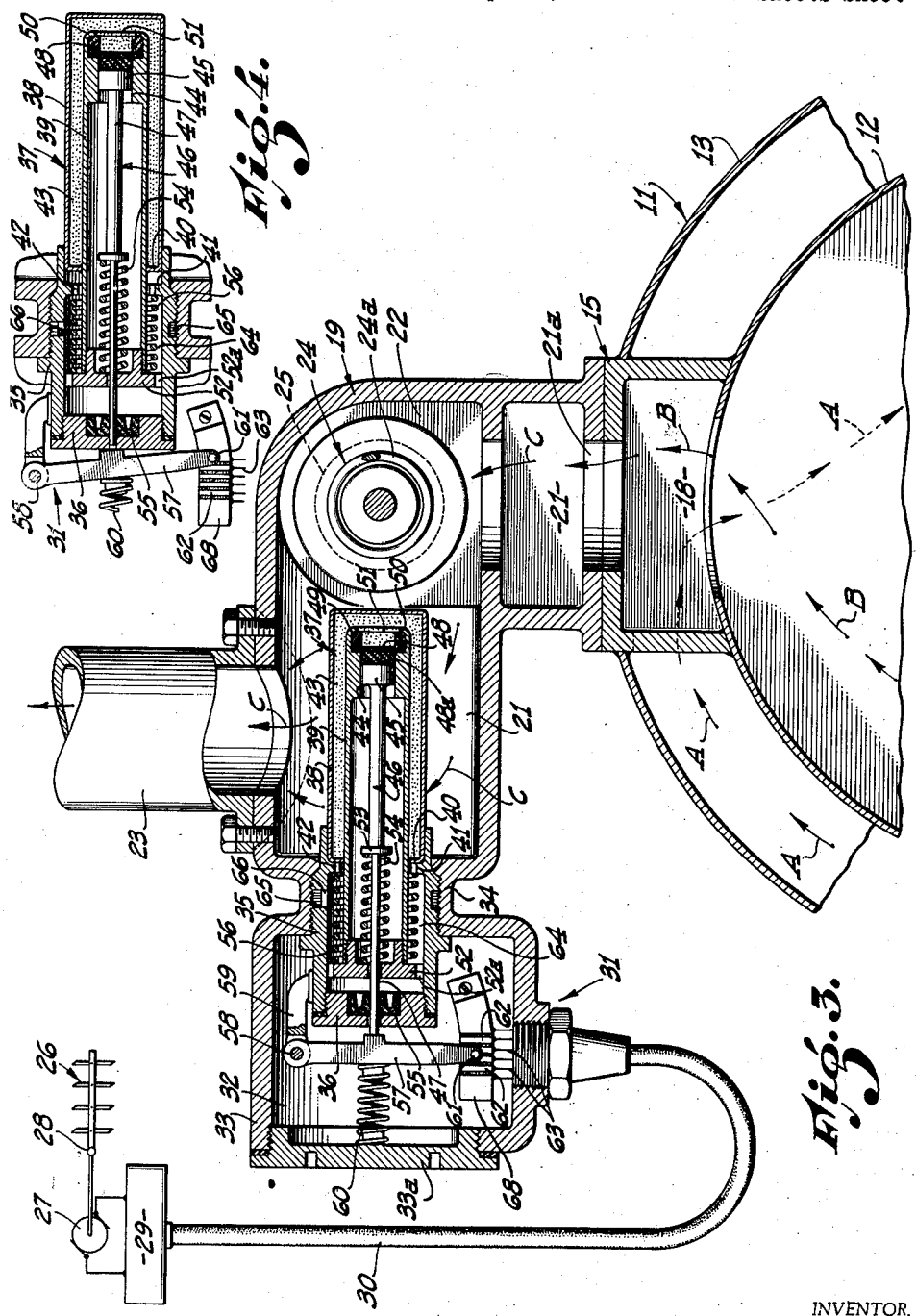
INVENTOR.
JAMES E. CHAPMAN
BY
ATTORNEY.

Patented Sept. 18, 1945

2,385,060

UNITED STATES PATENT OFFICE 2,385,060

MODULATING MEANS FOR COOLER CONTROL

James E. Chapman, Los Angeles, Calif., assignor to The Garrett Corporation, Airesearch Manufacturing Company division, Inglewood, Calif., a corporation of California Application September 7, 1942, Serial No. 457,611

2 Claims. (Cl. 257—2)

This invention relates in general to oil cooling systems for internal combustion engines. The invention has one application in the field of oil coolers for aircraft engines.

One type of oil cooler now generally employed for aircraft installation comprises a cellular type of heat exchanger having inlet and outlet openings which are respectively connected in series with the oil circulating system, a means for regulating the cooling action of the heat exchanger, and some form of control for the regulating means which acts to provide a flow of oil from the cooler to the aircraft engine within a temperature and viscosity range satisfactory for efficient operation and lubrication of the engine.

The heat exchanger is an oil container, often in the shape of a cylindrical drum, through which oil passes from an oil inlet to an oil outlet in heat exchange relation with metal tubes within the drum, through which atmospheric air is passed by the action of the aircraft propeller, supercharger or compressor means, or in consequence of the motion of the aircraft through the atmosphere.

The heat exchanger may include a supplementary oil container in the form of an oil jacket or muff surrounding a core or cooler proper in which the air tubes are mounted, or in the form of a separate compartment, within the cooling chamber, or both, through which oil as it comes from the engine may be passed to warm the cooling element.

To maintain constant the temperature of the oil leaving the cooler, the rate of transfer of heat units from the oil to the refrigerant air must be regulated to compensate for changing conditions of the oil and air streams. This regulation is accomplished in one type of cooler by varying the rate of flow of air through the core by use of movable shutters, flaps, or other air stream controlling means which may be adjusted in position with respect to the direction of the flow of air for varying the flow rate of air through the core tubes in combination with an actuating means for giving the shutters the movement of adjustment.

The problem of oil temperature control is complicated by the fact that under certain conditions congealing or waxing of the oil within the core on the external surfaces of the air tubes or other heat exchange walls takes place due to an abnormally rapid transfer of heat units from the oil to the air or to an unduly prolonged period of transfer of heat units from oil to air at a moderately rapid rate. This condition usually arises from an excessively rapid drop in the temperature of the atmospheric air or a rapid increase of air flow to which the thermostatic control cannot as rapidly respond. The formation of layers of waxed oil on the air tubes restricts the flow of oil through the core chamber, and may increase the pressure at the oil inlet of the cooler sufficiently to burst or otherwise damage the cooler drum. Also, since the layers of waxed oil, being of low heat conductivity, act as heat insulators between the liquid oil and the air, the oil flowing through the cooler in a restricted path at high speed leaves the cooler at an unduly high temperature. This hot oil is a disadvantage in the operation of the engine and by causing the thermostat to hold the shutters open prevents the decrease in the cooling action of the cooler which is necessary to melt the congealed oil.

Excessive pressure may also develop in the cooler core in the absence of waxing of oil on the air tubes if the core is filled with cold viscous oil when a cold engine is started, or for other reasons.

One object of the invention is the provision of a cooling system of the character described having a thermostatic control of the heat exchanger regulating means, in which the fluid pressure drop between the cooler inlet and cooler outlet or other spaced points in the oil passage is utilized under control of a thermostat to operate in either direction a reversible means to open or close the shutters or other air flow regulating means in a simple, effective, and reliable manner.

It is an object of the invention to provide a fluid cooling system with combined temperature and pressure control of the kind above described in which the temperature and pressure controls are combined in a novel and effective manner, affording structural simplicity and reliability in performance.

In pursuance of this general object, it is an object of the invention to provide a fluid cooling system with a combined temperature-pressure control in which the thermostatic control is disconnected from, or its operation modified with respect to, the shutter operating means by the fluid pressure control in correspondence with a pressure drop in excess of a predetermined value.

It is another object of the invention to provide a fluid cooling system having a combined temperature and pressure control in which a thermostat for effecting the temperature control is bodily movable by a fluid pressure operated device responsive to the pressure drop in the cooler in a manner to vary the control action of the thermostat on the shutter operating means. It is a further object to provide a fluid cooling system of the character described in which the thermostat is bodily moved by the means responsive to the pressure drop in the cooler in a manner to entirely nullify the control action of the thermostat on the shutter operating means and substitute therefor a control which operates to close the shutters to decrease the cooling capacity of the cooler.

It is a further object of the invention to provide a device of the character described in which the thermostat is bodily movable by reason of its connection to a movable wall, the two active faces of which are exposed to fluid pressure communicated to the movable wall from two relatively spaced stations along the flow path of the fluid stream.

It is also an object of the invention to provide a device of the character described in which the means for varying the cooling capacity of the cooler is operated by a reversible electric motor with a variable speed control switch which is movable in a direction to increase the cooling capacity of the cooler by the expanding movement of the live element of a thermostat working against a coiled spring or similar means tending to move the switch arm in the opposite direction, the overriding pressure control being accomplished by mounting the thermostat on a movable piston like plunger from which the live element of the thermostat extends toward the switch arm and which is resiliently held in a normal position toward the switch arm against a differential fluid pressure exerted on its two active faces which is a measure of the differential fluid pressure between the inlet and outlet of the cooler.

Further objects and advantages of the invention will be brought out in the following part of the specification.

Referring to the drawings which are for illustrative purposes only,

Fig. 1 is an elevational view partly in section and partly schematic of an oil cooling apparatus for an aircraft engine embodying this invention.

Fig. 2 is a sectional view taken along the line 2—2 of Fig. 1.

Fig. 3 is a sectional view taken along the line 3—3 of Fig. 1.

Fig. 4 shows a portion of Fig. 3 with the thermostat housing in a different position.

The cooling apparatus of an oil cooling system for an internal combustion engine is described herein to illustrate this invention. As to some of its features, however, the invention has other fields of application, and is not to be construed as restricted to the specific oil cooling device herein described, or as to some of its features to oil cooling devices generally, but is to be given the scope of the appended claims.

A heat exchanger 11 of the oil cooling apparatus shown in Fig. 1 comprises an oil container or core 12 constituting the oil cooler proper and a muff 13 which has the form of a cylindrical shell surrounding the core 12. The upper ends of the muff 13 are spaced apart to receive a rigidly related fitting 15, one end of the muff being in communication with an inlet chamber 16 of the fitting 15 through which it receives oil from the oil delivery piping 14 and the other end of the muff 13 being in communication with a chamber 17 of the fitting 15, through which oil passes as it leaves the muff. Oil from the chamber 17 may enter the core 12, passing therethrough in heat exchange relation with the air tubes (not shown), leaving the core through a chamber 18 formed in the fitting 15. Arrows A indicate the path of the oil from the oil delivery piping 14 through the muff 13 to the chamber 17, and arrows B indicate the path of the oil after it leaves the muff from the chamber 17 through the core 12 to the chamber 18.

A fitting 19 suitably secured to the fitting 15 serves as a housing for the control mechanism of the means for varying the cooling capacity of the core 12. The walls of the fitting 19 define a high pressure chamber 20 having a port 20a registering with the chamber 17 and a low pressure chamber 21 having a port 21a registering with the chamber 18. Oil passing through the core 12 into the chamber 18 flows through the low pressure chamber 21 to an outlet pipe 23 by which oil is returned to the engine, as indicated by arrows C.

A partition wall 22 between the high pressure chamber 20 and the low pressure chamber 21 is formed with a port 25 through which oil may flow from the chamber 17 to the high pressure chamber 20 to the low pressure chamber 21, as indicated by arrows D, under control of the check valve device 24, the spring 24a of which is adjusted to open the valve 24 when the pressure differential between the high pressure chamber 20 and the low pressure chamber 21 reaches a predetermined value. This pressure differential registers the drop in pressure in the oil stream as it flows through the core 12 from the chamber 17 to the chamber 18, and the pressure differential value at which the spring 24a permits opening of the port 25 is less by an adequate margin than that at which will occur bursting or other damage to the core, but is substantially greater than that required for proper and normal circulation of oil through the core. Upon opening of the check valve device 24 oil flows, after it leaves the muff 13 and enters the chamber 17, into the high pressure chamber 20 through the port 25 into the low pressure chamber 21, and thence to the cooled oil return piping 23 by which the oil is conducted back to the engine, as indicated by arrows D.

The rate of flow of the refrigerant air through the core 12 is regulated by shutters 26 which are moved between relatively open and relatively closed limit positions by a reversible means which is illustrated in the form of a reversible motor 27 and power transmitting devices 28.

Operation of the motor 27 is regulated by a control mechanism designated generally by the figure 31, which, by reference to Figs. 2 and 3, is seen to be contained within a chamber 32 defined by the walls of a projection 33 of the housing 19, within a portion of the low pressure chamber 21 and within a neck 34 between the main body of the fitting 19 and the projection 33 thereof. This control mechanism 31 combines in a novel manner temperature and pressure responsive elements, and will now be described.

A cylinder 35 is threadedly seated in fixed position in the bore of the neck 34. The cylinder is closed at its leftward end by a cylinder head nut 36. A plunger 37, constituting a pressure responsive means and also constituting a positioning means for the thermostat of the control mechanism 31, is slidably mounted in the cylinder 35. This plunger 37 comprises an outer drum 38 and an inner drum 39, the outer drum 38 being provided at its leftward end with an inturned flange 40, which is welded or otherwise secured to the inner drum 39. Sliding movement of the plunger or thermostat housing 37 within the cylinder 35 is guided by engagement of the leftward drum 38 with the bore face of the cylinder 35, by engagement of the inner drum 39 with an inwardly extending annular flange 41 formed on the cylinder 35 and by engagement of a drum head 52 at the leftward end of the inner drum 39 with the bore face of the cylinder 35. The drum head 52 is formed with circumferentially arranged ports 52a and the flange 41 is similarly formed with circumferentially arranged ports 42. The outer drum 38 is closed at its rightward end and the inner drum 39 has an inwardly turned flange 50 at its rightward end providing an aperture 51. The thermostat housing 37 is normally held in an extreme leftward position, in which the flange 40 engages the flange 41, by a coiled spring 56 seated between the flange 41 and the drum head 52.

The space between the cylinder 36 and the drum head 52, the space between the cylinder 35 and the leftward end portion of the inner drum 39, and the space within the inner drum 39, constitutes a chamber designated as 64. As best shown in Fig. 2, this chamber 64 is in communication with the high pressure chamber 20 through a passage 67 formed in the housing 19, an annular groove 65 in the outer threaded wall of the cylinder 35, and radial passages 66 connecting the groove 65 with the chamber 64.

The left end of the piston 37 is subjected to the pressure in the high pressure chamber 20, while the right end of the piston 37 is subjected to the pressure in the low pressure chamber 21. The piston 37 is moved to the right against the action of the spring 56 whenever the pressure differential of chambers 20 and 21 exceeds a predetermined value.

The thermostat means of the invention is arranged as follows. The wall of the inner drum 39 is inwardly thickened near its rightward end to provide a cylinder 44. A diaphragm 48 of suitable elastic material, such as neoprene, is held seated against the right end of the cylinder 44 by a retaining ring 49 which bears against the flange 50. The diaphragm 48 has a leftward extending disc shaped plug 48a which is preferably an integral part of the diaphragm and extends into the cylinder 44. A thermally expansible liquid or semi-liquid material 43 occupies the space between the outer drum 38 and the inner drum 39 and the space within the inner drum 39 to the right of the diaphragm 48, these two spaces being communicatingly connected by the aperture 51.

A live element 46 of the thermostat comprises a stem 47 and a piston 45 which slidably reciprocates within the cylinder 44. The piston 45 is resiliently held against the plug 48a by a coiled spring 54 seated between a flange 53 on the stem 47 and the drum head 52. Upon expansion of the thermal material 43, the diaphragm 48 is distorted leftwardly and the diaphragm plug 48a is moved to the left which in turn gives a leftward movement to the piston 45 and stem 47.

The left end of the stem 47 passes through a packing ring 55 in the cylinder head 36 and projects a short distance beyond the cylinder head 36 to laterally abut a switch arm 57 which is oscillatively mounted on a pivot pin 58 carried by a bracket arm 59 secured to the cylinder 35.

The switch arm 57 is held in contact with the stem 47 by a coiled spring 60 compressed between the switch arm 57 and a cover plate 33a on the projecting portion 33 of the fitting 19. The outer end of the switch arm 57 carries a movable contact 61 which passes over a series of stationary contacts 62 as the switch arm 57 moves to and fro under the action of the thermostat. The stationary contacts 62 are respectively connected to conductors 63 leading into a cable 30 which in turn leads to a motor control switch box 29. The electrical connections of the movable contacts 61, stationary contacts 62, and within the control box 29 are such that when the movable contact 61 engages any one of the stationary contacts 62 to the left of the center line of a bracket 68 upon which the stationary contacts are mounted, the motor 27 is operated to move the shutters 26 to a relatively open position, with respect to a shutter position which is about midway between an extreme open position and an extreme closed position, the degree of opening from this midway position for each contact varying with the extent of arcuate spacing of the movable contact 61 to the left of the center line of the bracket 68. When the movable contact 61 engages the extreme leftward stationary contact 62, the motor 27 moves the shutters to their extreme open position. Engagement of the switch arm 57 with the rightward contacts 62 operates to close the shutters according to a similar pattern.

From the above description, it is apparent that so long as the spring 56 holds the thermostat housing 37 in its extreme leftward position with the shoulder flange 40 against the shoulder flange 41, variations in temperatures of the oil leaving the core 12 and flowing through the low pressure chamber 21 in which the thermostat housing is disposed, are reflected in movements of the stem 47, which movements bring about operation of the motor 27 to move the shutters to relatively open positions in correlation with temperatures above the normal temperature of the oil returning to the engine and to move the shutters to relatively closed positions in correlation with temperatures of sub-normal value.

When, due to restriction of the flow of oil through the core 12 either due to the formation of layers of congealed oil on the air tubes within the core or due to high viscosity of the oil flowing through the core at a low temperature which the thermostat has not corrected or is correcting too slowly, the pressure differential between the chamber 17, at the core inlet, and the chamber 18, at the core outlet, increases to a predetermined value above normal, the action of the spring 56 is overcome and the thermostat housing 37 is caused to move to the right by the difference in fluid pressure in the chamber 64 and in the low pressure chamber 21. The thermostat housing may then occupy a position as shown in Fig. 4. As this pressure differential is established and as it increases, the spring 56 is gradually compressed, the entire assembly including the stem 47 begins a rightward movement and the movable contact 61, irrespective of its position with relation to the stationary contact 62, also begins a rightward movement. The effect is to modify the action of the thermostat 37 lowering the oil temperatures which correspond respectively to the several positions of the switch arm 57, and thereby lowering the oil temperature which corresponds to any given position of the shutters 26 for any given set of aircraft operative conditions. This change in correlation of the thermostat to shutter position slows down the cooling action of the cooler and accelerates the liquefaction of the congealed oil in the core if the rise in pressure differential is due to that cause. If the rise in pressure differential is due to high viscosity of cold oil in the core, warming of this cold oil is accelerated.

If the pressure differential becomes so great as to withdraw the stem 47 well within the cylinder head 36, the resultant effect is to entirely disconnect the thermostat from engagement with the switch arm, allowing the switch arm under the influence of the spring 69 to move to its extreme rightward position where the circuit is made which will completely close the shutters 26, reducing the rate of extraction of heat units from the oil to a minimum. Remembering that the temperature of the outgoing oil is sometimes excessive when layers of congealed oil form on the air tubes in the core, it will be observed that this high temperature is nevertheless powerless to cause the stem 47 to operate the switch arm 57 to open the shutters, because the simultaneous high pressure differential set up by the obstruction of the core is holding the thermostat housing 37 and the stem 47 in a sufficiently retracted position that even at the high oil temperature, it will not be projected from the cylinder head 36 into engagement with the switch arm 57.

From the foregoing description, it will be seen that my invention provides a thermostatic control for the shutter operating means which thermostatic control is in turn controlled or its action modified by a pressure differential responsive means. In addition to the broad combination, my invention also resides in the particular piston and thermostat arrangement which I have devised.

I claim as my invention:

1. In an oil cooling system for an internal combustion engine, the combination of: an oil cooler having an oil inlet through which oil may be received from the engine and an oil outlet through which oil may be discharged for return to the engine; means for varying the cooling capacity of said cooler; electric motor means for operating said varying means; an electric controller for said electric motor means having a movable switch arm for operating said motor means to increase the cooling capacity of said cooler when moved in a first direction and to decrease the cooling capacity of said cooler when moved in a second and opposite direction; a cylinder having a fixed head at one end and connected to said cooler inlet; a hollow plunger in said cylinder having a portion projecting therefrom in heat exchange relation with oil returning from said cooler to the engine and movable in one direction away from said head by fluid pressure in said cylinder; yieldable means for moving said plunger in the other direction; a temperature responsive means in said plunger; a member movable by said temperature means with respect to said plunger in said other direction, said member projecting through said head in fluid tight relation therewith to separably engage said switch arm to move it in said first direction; and yieldable means for moving said movable member in said other direction.

2. In an oil cooling system for an internal combustion engine, the combination of: an oil cooler having an oil inlet and an oil outlet there being an opening between said inlet and said outlet; means for varying the cooling capacity of said cooler; delivery piping connecting the oil outlet of the engine with the oil inlet of the cooler; return piping connected to said outlet for carrying cooled oil away from said cooler; thermostat means for controlling the operation of said varying means, said thermostat means having a part exposed to the temperature of the oil and a movable pair of relatively movable members connected so that relative disposition thereof is responsive to the temperature of the oil and so that the disposition thereof determines the action of said varying means; and a wall movably disposed across said opening between said inlet and said outlet so as to be moved by the pressure drop between said inlet and said outlet, said wall preventing substantial flow of oil through said opening from said inlet to said outlet, and said wall being secured to said thermostat so as to bodily move the same, whereby the thermostat will change the disposition of said members independently of the effect of the oil temperature on said thermostat means.

JAMES E. CHAPMAN.